Aug. 17, 1965 G. M. RAPATA 3,200,694
PLASTIC FASTENER
Filed Feb. 8, 1963
2 Sheets-Sheet 1

INVENTOR.
GEORGE M. RAPATA
BY
ATTORNEY

Aug. 17, 1965  G. M. RAPATA  3,200,694
PLASTIC FASTENER
Filed Feb. 8, 1963  2 Sheets-Sheet 2
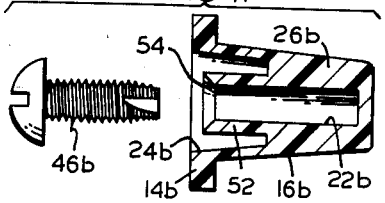
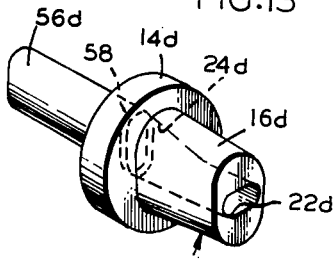
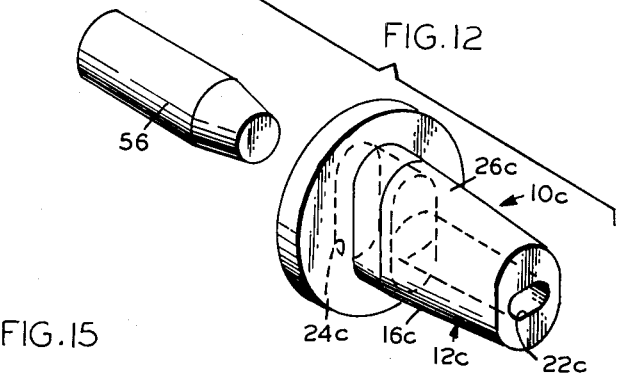
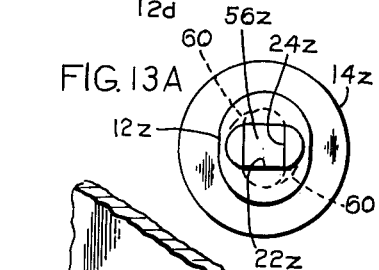
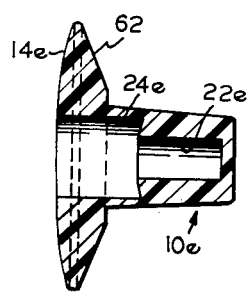
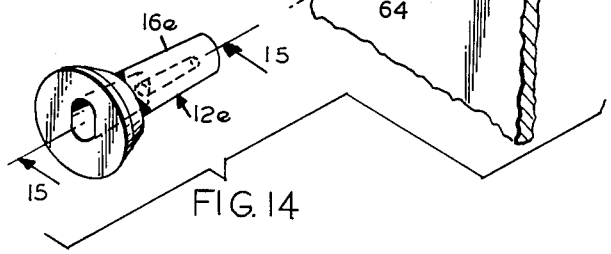
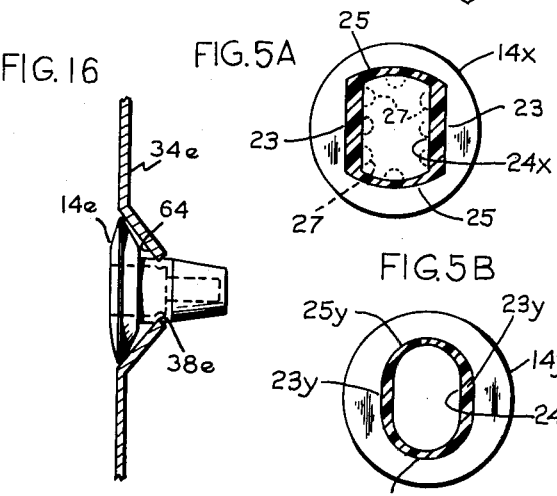
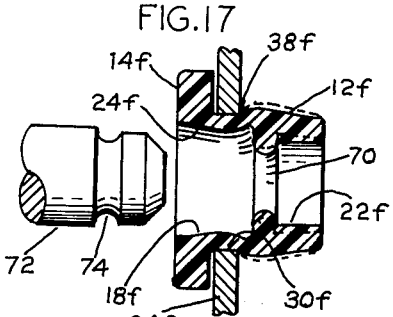
INVENTOR.
GEORGE M. RAPATA
BY
ATTORNEY United States Patent Office 3,200,694
Patented Aug. 17, 1965

3,200,694
PLASTIC FASTENER
George M. Rapata, Park Ridge, Ill., assignor to Illinois Tool Works Inc., Chicago, Ill., a corporation of Delaware
Filed Feb. 8, 1963, Ser. No. 257,339
12 Claims. (Cl. 85—82)

This invention relates to an improved fastener. More particularly, the invention contemplates a resilient plastic fastener having a simple design which permits the use of economical tooling to form an efficient fastener at a low cost.

Heretofore fasteners, of this general type, for assembly to an apertured workpiece have either required a multiplicity of parts or complex tooling to accomplish their fabrication. In the present instance the invention contemplates a one piece fastener preferably manufactured as an injection molded thermoplastic member. The device presents a smooth extereior surface which when inserted is deformed to provide abutment surface for retention in an apertured workpiece. This action is accomplished by a differential in wall strength measured along the axis of the fastener.

It is an object of this invention to provide a simple one piece plastic fastener having a differential in wall strength which permits deformation of smooth exterior wall for the creation of abutment surfaces to retain the fastener in an apertured workpiece.

A further object of the invention is to provide a plastic fastener having an uninterrupted exterior surface with a differential in wall thickness measured along the axis of the fastener so as to provide a differential in strength in said walls to facilitate the collapse of said walls at predetermined points.

Another object of the invention is to provide a headed plastic fastener having a hollow interior created by a bore passing through the head and with certain portions thereof being counterbored. The aforementioned controlled strength of the wall portions may be determined by orientation of said counterbores to position the deformable wall portions at predetermined locations.

A further object of the invetion is to provide a one piece plastic fastener of simple design which permits the use of economical tooling.

Other objects of the invention will become apparent to those skilled in the art when the specification is read in conjunction with the accompanying drawings wherein:

FIG. 5A is a sectional view of a modification to the thin wall portion of a device similar to that shown in FIGS. 1–5;

FIG. 5B is a sectional view of still another modification to the thin wall portion of a device similar to that shown in FIGS. 1–5;

FIG. 11 is an elevational view in section showing a modification to the device shown in FIG. 10 with the addition of a tubular extension to facilitate insertion of the screw;

FIG. 12 is a further embodiment of the present invention, shown in perspective, wherein a smooth expanding member is utilized;

FIG. 13 is a perspective view of still another embodiment of the invention;

FIG. 13A is a shank end view of a modifiication to the embodiment shown in FIG. 13;

FIG. 14 is an exploded view in perspective of an embodiment of the invention adapted to be utilized with a counterbored aperture in a panel;

FIG. 15 is an elevation in section taken along lines 15—15 of FIG. 14;

FIG. 16 is an elevational view in partial section showing the device of FIG. 14 in an installed position; and FIG. 17 is a sectional elevation of a linkage bushing embodying the principles of this invention.

Figure 2:
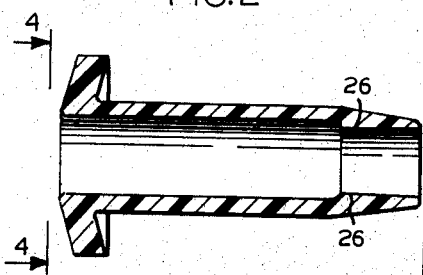
FIG. 2 is an elevational view in section as viewed along line 2—2 of FIG. 4 of the same device rotated 90° about its axis.
Figures 4, 5:
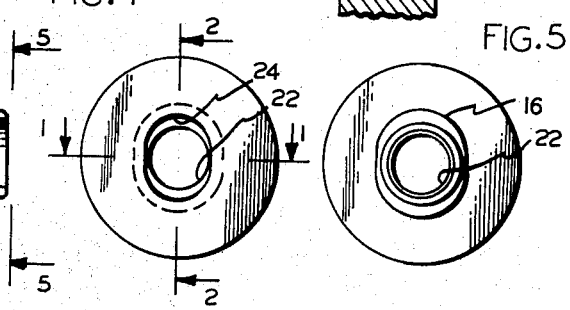
FIG. 4 is an end view taken along line 4—4 of FIG. 2.
FIG. 5 is an end view taken along line 5—5 of FIG. 2.
Figure 6:
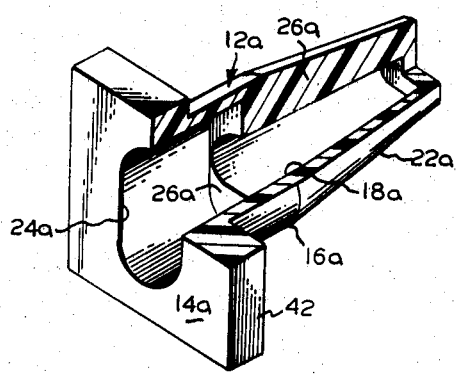
FIG. 6 is a perspective view in partial section of a second embodiment of the present invention.

Referring more specifically now to the drawings wherein similar parts will be designated by similar numerals. A fastener of the type embodying the principles of this invention and generally designated by the numeral 10 includes a shank 12 and a head 14. The shank 12 is generally tubular in configuration having a smooth external wall surface 16 and an internal bore 18. In the present instance, the end of the shank 12 opposite to the head 14 is tapered slightly as at 20 to facilitate insertion in a workpiece aperture. The inner bore 18 traverses the head 14. The shank can be construed as having two portions with the first portion being adjacent the entering end, opposite the head 14, while the second portion extends between the first portion and the head. The bore in said first portion generally designated 22, in the present instance is generally circular in cross sectional configuration, as best seen in FIGS. 4 and 5, while the bore in the second portion generally designated 24 may be either oval or elliptical in configuration. The outer surface 16 of the shank in the present embodiment is also oval in cross sectional configuration when viewed transverse to the axis. Thus, the entering end portion of the hollow shank is provided with a predetermined wall thickness throughout the portion 22 and a second wall thickness, coextensive with portion 24, is provided intermediate the head 14 and the first portion 22. In the present instance, the use of the circular configuration to portion 22 of the bore with an external oval configuration provides opposed thickened wall portions generally designated 26 in FIG. 2. It must be recognized, of course, that the outer surface could be cylindrical with the shape of the bore 18 being selected from circles, ovals, or ellipse to provide the desired thick and thin wall portions.

In the present instance, the head 14 is dished concavely towards the entering end of the shank 12 which blends out to a fine edge 28 suitable for sealing purposes around the aperture of a workpiece.

Figure 1:
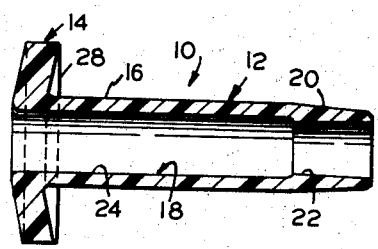
FIG. 1 is an elevational view in section taken along line 1—1 of FIG. 4 of a device embodying the principles of the present invention.
Figure 3:
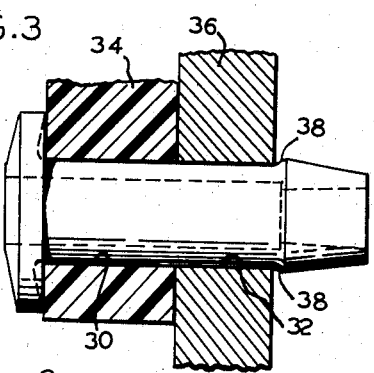
FIG. 3 is an elevational view showing the same device in inserted position in an apertured workpiece.

A typical installation of a fastener of the type described is shown in FIG. 3. The fastener 10 is axially telescoped through a pair of circular apertures 30 and 32 in the workpieces 34 and 36 respectively. The elliptical configuration of the exterior surface 16 is so designed that its major axis is greater than the diameter of the workpiece apertures 30 and 32 while its minor axis is less than the diameter of said workpiece apertures. Thus, when the tapered entering end is inserted into the apertures in the workpiece, the major axis of the fastener is collapsed with a corresponding increase in the dimension of the fastener along its minor axis. The thickened portions 26 positioned on the major axis move towards one another until portion 22 of the bore has traversed the thickness of the workpieces. At this point, the thickened portions 26 will expand laterally outwardly while the major axis portion of the thinner wall portion 24 remains collapsed. This outward expansion creates abutment surfaces 38 as seen in FIG. 3 which are adapted to underlie the workpiece or panel 36 while the head 14 is in engagement with the opposite side of the workpiece, namely, panel 34. This action can be controlled by controlling the differential in wall strength between portions 22 and 24. The thickened wall in the axial portion 22 of the fastener requires a certain radial force to deform it during insertion and exerts a similar amount of force, due to the resilience of the material, during its return to its initial position after traversing the apertured workpiece. The forces required to deform the thinner wall section defining the second portion 24 of the shank is substantially less than the force to deform first portion 22 resulting in the establishment of the external abutments 38. The dishing of head 14 serves the dual function of providing take up of manufacturing tolerances due to differentials in thickness of panels 34 and 36 while still permitting the creation of abutments 38; further, the line contact between workpiece 34 and the peripheral edge 28 of the head 14 provides a seal between the fastener and the workpiece to prevent the passage of water or other materials around the stud and through the aperture. While the bore 18 in the present instance traverses the entire shank it will be appreciated from the other embodiments described hereinbelow that the entering end can be closed so as to provide a total closure or seal.

A fastener of the type described must be semi-rigid and yet resilient and can be fabricated by injection molding from thermoplastic materials, such as nylon or an acetal type resin by standard injection molding techniques. An important feature of this device is that it can be fabricated with a simple two plate mold without any side action.

Modifications to the thin wall portion of this first embodiment can be seen in FIGS. 5A and 5B on the second sheet of drawings. Both of the modifications are shown as transverse sections through the thin walled portion looking towards the head with similar parts designated by similar numerals with the addition of the suffices x and y respectively.

The modification seen in FIG. 5A has a double D or rectangular section through portion 24x. The device is preferably provided with a pair of opposed straight side walls 23 interconnected by opposed slightly curved walls 25. The curved walls 25 has a reduced thickness as compared to the thickness of walls 23 and are each adapted to collapse inwardly to form an abutment similar to abutment 38 formed on the first embodiment. This device is specifically adapted for use with a square aperture in a workpiece. The thickened side walls 23 afford the device increased strength in resisting forces applied to the device in torque and/or in tension. An optional feature is the provision of internally located longitudinal ribs 27, shown in phantom, for increasing the cross-sectional area of the walls and hence increasing resistance to torque and/or tension without increasing stiffness during installation.

The other modification, as seen in FIG. 5B, provides opposed side walls 23y which are joined by thinner end walls 25y forming in section a pair of concentric ovals. The end walls 25y being tapered in thickness so that the thinnest portion, formed by proportionately different radii, falls on the major axis of the oval. This thinned wall effectively concentrates the forces deforming the wall to form the abutments at preselected opposite locations.

A second embodiment which utilizes the principles of this present invention is shown in FIG. 6–10 wherein similar parts are designated by similar numerals with the addition of the suffix a. In this embodiment the apparent differences in the stud portions are even more pronounced in the drawings than in the first example. The head 14a has a non-circular external configuration which provides wrenching faces 42 for purposes best set forth hereinafter. The shank 12a has an external surface 16a which is substantially uninterrupted and smooth and is initially generally oval in cross sectional configuration. Its first portion 22a tapers towards the entering end and has an oval bore with the major and minor axes of the bore rotated 90° relative to the corresponding axes of the external surface 16a.

The second portion 24a has a bore which is also oval but with its major and minor dimensions in registry with the coresponding axes of the external surface 16a. The bore traversing the second portion 24a extends through the head of the fastener for purposes best set forth hereinafter. The dimension or size of the major axis of the bore in first portion 22a is preferably equal to or less than the dimension of the minor axis of the oval bore in second portion 24a. The bore in the second portion 24a being symmetrical with the external surface 16a provides a substantially uniform thin wall between the head and first portion 22a. Thus, there is a pair of opposed thickened portions 26a, similar to those provided in the first embodiment. The bore of first portion 22a at its throat on entering into the bore of second portion 24a may also be provided with a slight lead or chamfer 44.

Figure 8:
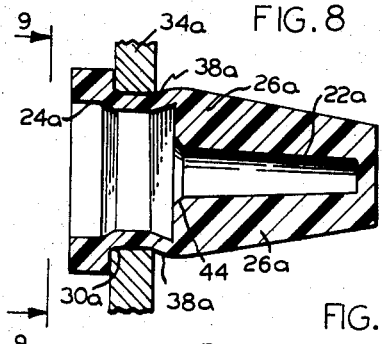
FIG. 8 is an elevational view in section showing the device of FIG. 6 inserted in a workpiece aperture.
Figures 7, 9:
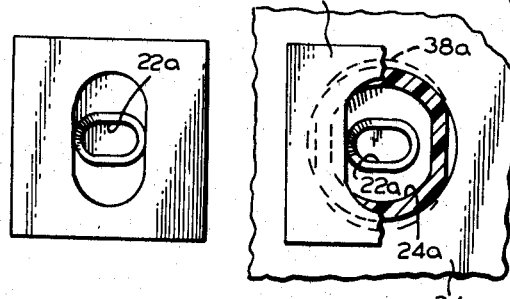
FIG. 7 is a view from the head end of the second embodiment shown in FIG 6.
FIG. 9 is an end view in partial section taken along line 9—9 of FIG. 8.

The shank 12a when inserted into a workpiece aperture which is circular in shape will collapse inwardly with the thickened portions 26a moving towards one another while the wall portions on the major axis will bevel outwardly slightly. After the fastener has been telescoped with the workpiece aperture 30a of the workpiece 34a, the thickened portions 26a will expand outwardly substantially to their initial configuration with the deformation of the thin wall portion 24a forming abutment surfaces 38a, as best seen in FIGS. 8 and 9.

Figure 10:
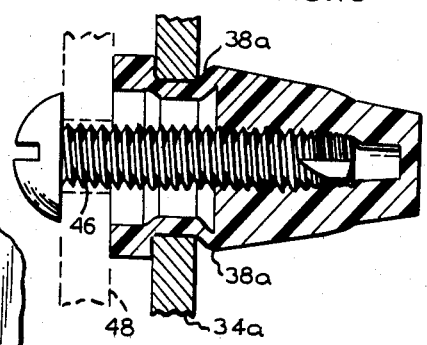
FIG. 10 is an elevational view in partial section showing the installed device of FIG. 8 with a screw threaded member inserted in its bore.

While a device of the type presently being described can be utilized to secure a plurality of panels together as in the case of the initial embodiment, as by controlling the axial extent of the bore and counterbore, it is in its present condition ideally suited as an anchoring member for a secondary stud, such as screw 46. As can be seen in FIG. 10, a screw 46, of predetermined diameter, can be threaded into the smaller bore in the first position 22a. In the present instance, the screw 46 is of the thread cutting type whereby it will form its own thread in the bore. Similarly, the diameter of the screw is controlled so that it will force the thickened portions 26a to expand laterally outwardly and to thereby increase the lateral dimension of the abutment surfaces 38a which thereby more aggressively underlie the panel 34a. A secondary work element 48 shown in phantom can then be secured relative to the workpiece 34a. The wrenching faces 42 are adapted to accept suitable means for the prevention of rotation of the fastener when screw 46 is driven into the bore.

A further modification to the present invention is contemplated by the device shown in FIG. 11 wherein similar parts are designated by similar numerals with the addition of the suffix b. In this device the outer surface 16b of the shank is tapered throughout its extent from its integral connections with head 14b to the opposite entering end. The thickened portions 26b defined by the bore in the first portion 22b and the bore in the second portion 24b are positioned intermediate the axial extent of the shank. In this embodiment, the bore of first portion 22b is substantially circular in cross section transverse to the axis of the fastener while the bore in the second portion 24b is substantially oval or elliptical and tapers outwardly through the head so as to provide a substantially uniform thin wall section for the purposes set forth hereinabove.

In the present device, the bore 22b is continued beyond the thickened portions 26b by the provision of a tubular extension 52 having a chamfered opening 54 adapted to accept a screw 46b. The operation of the present device is substantially identical to the other embodiments previously described with the exception that the tubular extension 52 with its chamfered opening 54 simplifies the location and insertion of the screw threaded number 46b.

Another form of the present invention is shown in perspective view FIG. 12, wherein similar parts will be designated by similar numerals with the addition of the suffix c. In this embodiment the external surface 16c of the shank 12c is general oval in configuration when viewed in cross section transverse to the axis of the fastener. Its internal bores and counterbores of first position 22c and second portion 24c, respectively, are also oval with the major and minor axes of the bore of the first portion 22c being rotated 90° relative to the major and minor axes of external surface 16c and bore 24c. As was the case of the device shown in FIGS. 6–10 this present device is provided with the major axis of the bore in the first portion 22c being substantially equal to or less than the minor axis of bore 24c. In the previous embodiments, a screw 46 was utilized as a secondary expansion means. In the present device, it is proposed that a tapered pin 56, having a diameter at the large end of its taper which is substantially greater than the minor axis of bore 22c, be utilized for expansion purposes. After the fastener 10c is inserted into a suitable circular aperture in a workpiece, the portion having a thickened wall section 26c will expand behind the work panel and the telescoping of tapered pin 56 into the bore will further expand the abutment surfaces created by the differential in strength of the thin walled portion and thereby more positively retain the fastener.

Another embodiment of the invention may be seen in FIG. 13 wherein similar parts will be designated by similar numerals with the addition of the suffix d. In this embodiment, the shank 12d is provided with a tapered external surface 16d which is substantially oval in configuration. The first portion 22d of the shank adjacent its entering end is provided with an oval bore having its axes rotated substantially 90° to the axes of the oval exterior surface 16d. The second portion 24d of the shank intermediate the entering end and the head 14d is provided with an oval transverse section havings its axes lying in the same planes as the axes of the external surface. An expander pin 56d is provided for entry through the head and if desired may be molded integrally with the upper extremity of the head by a frangible section 58. The expander pin 56d has an exterior configuration in transverse section substantially complementary to the bore 24d which passes through the head 14d and the second portion 24d of the shank 12d. In this embodiment, the bore in second portion 24d blends into and tapers down to the configuration of the bore 22d as opposed to the sharp or marked demarcation line present in the other embodiments. Preferably the bore is a generated form with the circumferential measurement of the bore remaining constant at any section transverse to the axis of the fastener. The operation of this device, of course, would be similar, in that insertion of the shank 12d within a circular aperture in a workpiece results in a collapse of the shank along the major axes of the exterior surface 16d until such time as the thickened portions of the wall surrounding bore 22d traverse the workpiece aperture and then expand internally behind the workpiece. A sharp blow on pin 56d will fracture the frangible section 58 and drive pin 56d into the shank bore in portions 24d and 22d respectively. This will further distend the shank along the major axis of its external surface 16d thereby increasing the protuberance or abutment surfaces underlying an appropriate workpiece and assuring a positive retention.

A modification to the device shown in FIG. 13 can be best seen in FIG. 13a wherein similar parts are designated by similar numerals with the addition of the suffix z. This modification as shown in a view from the free end of the stud towards the head, has the oval bore disposed in a horizontal attitude at the free end in portion 22z and in a vertical attitude at the head end in portion 24z. In this modification, the bore is not a generated form of the type shown in FIG. 13 but instead is a constant oval having a helical twist imposed thereon, as indicated by the dotted lines 60. This permits the use of a single piece core pin in the mold which will be rotated 90° during its withdrawal after formation of the part.

In the application of this part to a workpiece a complementary drive pin 56z is driven axially into the fastener. With the alignment of the pin 56z restricted by portion 24z at the head end the helical disposition of the bore will result in a twisting of the shank 12z in its free end portion 22z to bring same into alignment with portion 24z. This twisting of shank 12z will tend to foreshorten said shank and assist in the retention power of the fastener by increasing the size of the abutment formed in portion 24z by techniques previously described.

Still another embodiment of the present invention is shown in FIGS. 14–16 wherein similar parts are designated by similar numerals with the addition of the suffix e. In this embodiment, the shank 12e is provided with an external surface 16e substantially identical to that shown in FIGS. 6–9. Similarly, the internal bore in portions 22e and 24e in the first and second portions of the shank respectively, are also ovals of rotated and coplanar orientation respectively. In the present instance, the fastener 10e is provided with a head 14e having a tapered undersurface 62 with a predetermined included angle. The tapered surface 62 is adapted to be accepted within the countersunk portion 64 of the aperture 30e located in the workpiece 34e. As best seen in FIG. 16, the telescoping of the fastener 10e with the countersunk apertured workpiece 34e results in a substantially flush panel mounting. The edge of aperture 30e collapsing the first portion 22e until said first portion traverses the workpiece aperture and then expands outwardly to form abutments 38e which underlie the panel in opposition to head 14a. As can be best seen in FIG. 16, the countersunk portion 64 of the work panel 34e can be provided with a plurality of included angles due to manufacturing tolerances but the fastener 10e will still be effectively retained solely by the movement of the abutments 38e along the axial extent of the fastener. This embodiment is also similarly adapted to accept a screw threaded fastener, not shown, in the manner previously described for the other embodiments and can be adapted for the retention of a plurality of work panels, not shown, by controlling the length of portion 24e.

The teachings of this invention are also applicable to other forms of fastenings than those previously described. FIG. 17 illustrates a linkage bushing utilizing such principles, wherein similar parts are designated by similar numerals with the addition of the suffix f.

The bushing has a head 14f, a smooth exterior shank 12f and a through bore 18f. Said bore 18f is smaller in transverse section at the free or entering end, designated portion 22f, than at its head end, designated portion 24f, thereby providing a stiffer thickened wall portion at the enternig end. This results in a deformation of portion 24f to produce abutments 38f when the bushing is inserted in aperture 30f of the workpiece 34f.

The bushing is provided with an internally directed rib 70 at the juncture of portions 22f and 24f. Rib 70 is adapted to engage and cooperate with groove 74 in rod 72 when the latter is axially telescoped into the bushing bore. The insertion of rod 72 into bore 18f will distend portion 22f and its adjacent rib 70 to a form substantially as shown in phantom.

The bushing may have a smooth round, oval or rectangular exterior surface and an oval or round interior bore. The rib 70 has been found preferable when supplied with an oval configuration.

While certain of these embodiments have been shown with closed ends and others have been shown with open ends, it is felt that this illustrates the simplicity of design inherent in this fastener since a sealing type fastener can be provided without major mold changes. The inventive concept illustrated by the various embodiments contemplates a differential in wall strength in the shank of a fastener as measured along its axial extent. This permits a simple design for a fastener having a smooth uninterrupted outside wall with differentiations in the internal bore to vary the wall thickness along the length of the axis of the fastener. These wall thicknesses provide the differential in strength and can be controlled by orientation of the bore and counterbore, previously defined as the first and second portions respectively, of the shank section. While all of the embodiments described hereinabove have utilized an external surface on the shank which is substantially oval in transverse cross section in conjunction with circular apertures in workpieces, it is contemplated by the inventor that similar devices can be constructed which would utilize oval apertures in the workpiece and circular surfaces in transverse section in the shank portions of the fastener. While these illustrative embodiments are the only ones presented by the inventor as illustrative embodiments of his invention, he is certain that those skilled in the art will certainly think of other combinations which might be equally effective, i.e. combinations of triangles, rectangles, etc. but it is his intent that he be limited only by the appended claims.

I claim:

1. A resilient one piece plastic fastener in combination with a workpiece having an aperture of predetermined configuration and transverse dimension, said fastener including a shank and a laterally extending head at one end of said shank, said head provided with an axially extending counterbore which extends through said head and for a predetermined distance into said shank, said counterbore being generally oval in transverse section with major and minor axes and the outer shank surface being generally complemental in transverse section to said counterbore, a second bore provided in said shank of smaller transverse dimension than said counterbore and having its longitudinal axis coincident with the longitudinal axis of the counterbore in said head, said second bore communicating with said counterbore, said shank in transverse sections spaced along its axis presenting a first portion having a continuous thin wall section in the vicinity of said head and a second portion having a thicker wall section of substantial axial extent and extending from said first portion to the vicinity of the terminal end portion of said shank, the walls of said workpiece aperture forming a substantially circular surface adapted to contact a portion of said outer shank surface in the vicinity of said laterally extending head when the fastener is finally positioned in the workpiece aperture, said second bore being circular in transverse section and of appreciable radial extent from its longitudinal axis and being substantially equal to but permissively slightly less than the minor axis of said counterbore to facilitate deformation of the thicker wall portion of the shank, said workpiece aperture being so dimensioned as to deform the wall section of the entering end of the fastener as it passes through the workpiece aperture and to deform the thinner wall section of said shank in the vicinity of said head to form retaining shoulder means when the fastener is in finally mounted position relative to the apertured workpiece and the thickened wall section of the terminal end portion of the shank has returned to its normal dimension after the temporary deformation of it by said workpiece aperture.

2. A resilient one piece plastic fastener in combination with a workpiece having an aperture of predetermined configuration and transverse dimension, said fastener including a shank and a laterally extending head at one end of said shank, said head provided with an axially extending counterbore through said head and for a predetermined distance into said shank and defining in transverse section an oval with major and minor axes, a second bore provided in said shank of smaller transverse dimension than said counterbore and having its longitudinal axis which is coincident with the longitudinal axis of the counterbore in said head, said second bore communicating with said counterbore and defining in transverse section an oval with major and minor axes rotated 90° relative to the major and minor axes of said counterbore, said shank in transverse sections spaced along its axis presenting a first portion having a continuous thin wall section in the vicinity of said head and a second portion having a thicker wall section of substantial axial extent and extending from said first portion to the vicinity of the terminal end portion of said shank, the outer surface of said shank in the vicinity of said laterally extending head having a complementary configuration to the counterbore provided in the shank section adjacent said head with its major and minor axes in a substantial registry with the major and minor axes of said counterbore, the walls of said workpiece aperture forming a substantially circular surface adapted to contact a portion of said outer shank surface in the vicinity of said laterally extending head when the fastener is finally positioned in the workpiece aperture, the outer surface of said shank around said second bore generally defining an oval in transverse section generally complementary to said second bore, said workpiece aperture being so dimensioned as to deform the wall section of the entering end of the fastener as it passes through the workpiece aperture and to deform the thinner wall section of said shank in the vicinity of said head to form retaining shoulder means when the fastener is in finally mounted position relative to the apertured workpiece and the wall section of the entering end of said shank portion has returned to its normal dimension after the temporary deformtion of it by said workpiece aperture.

3. A device of the type claimed in claim 2 wherein the circular aperture in the workpiece has a diameter at least equal to the dimension of the outer surface in the vicinity of the head located on the minor axis but less than the dimension of the outside surface of the shank located on the major axis.

4. A device of the type claimed in claim 2 wherein the outer surface of said shank is tapered toward the terminal end.

5. A device of the type claimed in claim 2 wherein said second bore is tapered toward the terminal end.

6. A device of the type claimed in claim 2 wherein the oval counterbore in the vicinity of said head has its dimension along its major axis proportionately greater than the dimension of the exterior surface along its major axis so as to provide thin walled portions in opposition substantially on the major axis of the oval forms.

7. A device of the type claimed in claim 2 wherein the minor axis of said counterbore is at least equal to or greater than the major axis of said second bore.

8. A device of the type claimed in claim 2 wherein the counterbore is tapered to blend into the second bore at their juncture, secondary means having a transverse measurement greater than the equivalent measurement of the second bore adapted to be telescoped into said second bore and to transversely spread said thicker wall section to assist in the formation of said shoulder means in the vicinity of said head.

9. A device of the type claimed in claim 8 wherein said secondary means is a pin integrally molded at one of its ends to the head by a frangible section adapted to be fractured when said pin is struck a blow and driven into said bore.

10. A device of the type claimed in claim 2 wherein the counterbore and second bore are substantially identical ovals in section and are interconnected by a helically disposed oval bore having substantially the same cross section as the bore in said counterbore and second bore portions.

11. A device of the type claimed in claim 10 wherein a substantially rigid secondary means having a complementary oval configuration is axially driven into said bore whereby said second portion of the shank is twisted and rotated due to the helical disposition of the bore interacting with said secondary means and the axes of the bore in said second portion are finally disposed substantially in regitser with the axes of said counterbore portion.

12. A one piece plastic fastener for use in an aperture workpiece having a substantially smooth uninterrupted and continuous exterior surfaced shank and a head extending laterally from one end of said shank, said shank having a first portion adjacent its entering end opposite said head and a second portion intermediate said head and said first portion, a bore traversing the head and substantially the entire shank along the axis of the fastener, said bore in the head and second portion having a greater cross sectional area as measured transversely to the axis than the cross sectional area of the bore in said first portion whereby said second portion is provided with a thinned wall section of predetermined resiliency and said first portion having a substantially heavier wall section which provides a stronger resilient action than the predetermined resiliency of said second portion, said first portion being adapted to distort inwardly while being telescoped through an appropriately apertured workpiece and to substantially resume its initial configuration after traversing the workpiece, said second portion being deformed inwardly to form shoulder means in engagement with one side of the workpiece in opposition to the head on the opposite side of the workpiece, the exterior surface of said shank is generally rectangular in transverse section with the bore in said first and second portions being generally proportionately modified rectangles in transverse section, said fastener being adapted to be utilized in a substantially square aperture having its sides lesser than the major side dimension of the rectangular exterior surface, the end walls forming the minor dimension of the rectangle being bowed outwardly, said end walls being substantially thinner than the side walls forming the major dimension of said rectangle.

References Cited by the Examiner

UNITED STATES PATENTS

| | | | |
|---|---|---|---|
| 2,150,080 | 3/39 | Rawlings | 85—83 |
| 2,264,747 | 12/41 | Fether | 85—82 |
| 2,367,883 | 1/45 | Miller | 85—82 |
| 2,426,326 | 8/47 | Tooms. | |
| 2,657,894 | 11/53 | Sklenar | 85—72 |
| 2,780,128 | 2/57 | Rapata | 85—5 |
| 2,887,926 | 5/59 | Edwards | 85—70 |
| 2,933,794 | 4/60 | Biesecker | 85—40 |
| 2,976,345 | 3/61 | Whitted | 151—41.75 |
| 3,033,624 | 5/62 | Biesecker | 85—82 |

EDWARD C. ALLEN, *Primary Examiner.*